(12) United States Patent
Tanaka et al.

(10) Patent No.: US 8,666,616 B2
(45) Date of Patent: Mar. 4, 2014

(54) CONTINUOUSLY VARIABLE TRANSMISSION AND CONTROL METHOD THEREFORE

(75) Inventors: Hiroyasu Tanaka, Atsugi (JP);
Masahide Ito, Atsugi (JP); Masato Mori, Isehara (JP); Takashi Eguchi, Machida (JP); Ryousuke Nonomura, Kawasaki (JP); Seiichiro Takahashi, Isehara (JP); Mamiko Inoue, Ebina (JP)

(73) Assignee: Jatco Ltd, Fuji-shi (JP)

( * ) Notice: Subject to any disclaimer, the term of this patent is extended or adjusted under 35 U.S.C. 154(b) by 267 days.

(21) Appl. No.: 13/216,990

(22) Filed: Aug. 24, 2011

(65) Prior Publication Data

US 2012/0059557 A1   Mar. 8, 2012

(30) Foreign Application Priority Data

Sep. 8, 2010 (JP) ................................ 2010-200827

(51) Int. Cl.
*F16H 61/00* (2006.01)
(52) U.S. Cl.
USPC .............................................. 701/52; 192/31
(58) Field of Classification Search
USPC ........ 701/51, 52; 192/3.51, 3.61, 215, 217.4, 192/223, 12 R, 20, 30 R, 31; 477/3, 5, 6, 8, 477/15, 20, 34, 81, 39, 77
See application file for complete search history.

(56) References Cited

U.S. PATENT DOCUMENTS

| 5,908,370 | A | 6/1999 | Kubo et al. |
| 6,736,757 | B2 | 5/2004 | Kubo et al. |
| 7,493,203 | B2 | 2/2009 | Bitzer et al. |
| 7,698,041 | B2 * | 4/2010 | Streib .............................. 701/51 |
| 7,862,459 | B2 * | 1/2011 | Ishioka ........................... 474/70 |
| 2002/0142886 | A1 | 10/2002 | Kubo et al. |
| 2005/0227809 | A1 | 10/2005 | Bitzer et al. |

FOREIGN PATENT DOCUMENTS

| EP | 1 865 227 A1 | 12/2007 |
| EP | 1 933 064 A2 | 6/2008 |
| EP | 2 169 279 A1 | 3/2010 |
| JP | 05-079554 A | 3/1993 |
| JP | 09-296862 A | 11/1997 |
| JP | 2001-221338 A | 8/2001 |
| JP | 2002-243031 A | 8/2002 |
| JP | 2002-295663 A | 10/2002 |
| WO | WO 03/067127 A2 | 8/2003 |

* cited by examiner

*Primary Examiner* — Dalena Tran
(74) *Attorney, Agent, or Firm* — Foley & Lardner LLP (57) ABSTRACT

A transmission control unit reduces a hydraulic pressure of a release-side frictional engagement element which is to be released of a sub-transmission mechanism and reduces this reduction amount as an input torque to the sub-transmission mechanism increases at the time of starting a shift when a manual mode is selected, the input torque is positive and the sub-transmission mechanism is to be shifted down.

12 Claims, 6 Drawing Sheets

FIG. 6

CONTINUOUSLY VARIABLE TRANSMISSION AND CONTROL METHOD THEREFORE

FIELD OF THE INVENTION

The present invention relates to a continuously variable transmission and a control method therefor and particularly to a continuously variable transmission including a continuously variable transmission mechanism and a sub-transmission mechanism.

BACKGROUND OF THE INVENTION

In a continuously variable transmission (hereinafter, referred to as a "CVT with a sub-transmission mechanism") including a combination of a continuously variable transmission mechanism (variator) and a sub-transmission mechanism, a shift range can be enlarged and fuel economy can be improved as compared with normal continuously variable transmissions.

In the case of shifting the sub-transmission mechanism in this CVT with the sub-transmission mechanism, it is possible to suppress a change of a through speed ratio, which is a speed ratio of the entire transmission, before and after the shift and suppress a shift shock by performing a synchronization shift for shifting a speed ratio of the variator in a direction opposite to a shifting direction of the sub-transmission mechanism (JP5-79554A).

A technology for providing a manual mode in a continuously variable transmission and controlling a speed ratio of the continuously variable transmission to a speed ratio corresponding to a gear position selected by a driver is known (JP2002-243031).

SUMMARY OF THE INVENTION

It is also possible to provide a manual mode in a CVT with a sub-transmission mechanism. In the CVT with the sub-transmission mechanism including the manual mode, the variator and the sub-transmission mechanism are so controlled that a through speed ratio becomes a speed ratio corresponding to a gear position selected by a selector operation or paddle operation of a driver. Although a gear position of the sub-transmission mechanism is changed depending on the selected gear position, a shift shock can be suppressed if the above synchronization shift is performed.

However, if the sub-transmission mechanism is shifted down in response to a selector operation or paddle operation of the driver when an input torque to the sub-transmission mechanism is large, it is a down shift of the sub-transmission mechanism under the condition that the sub-transmission mechanism is not shifted in a normal D position. Thus, there is a possibility of an engine runup and an unintended shift shock if a normal synchronization control is applied.

The engine runup occurs because a shift speed of the sub-transmission mechanism is accelerated according to an input torque (reducing speed of a hydraulic pressure of a release-side frictional engagement element (frictional engagement element to be released by a shift) is increased), whereas a shift speed of the variator becomes slower than that of the sub-transmission mechanism due to an inertia or like influence, and thus, synchronization of the both is lost. The shift shock occurs because an inertia phase of the sub-transmission mechanism accelerates as the input torque increases, and thus, the supply of a hydraulic pressure to an engage-side frictional engagement element (frictional engagement element to be engaged by the shift) is delayed and the engage-side frictional engagement element is suddenly engaged with delay.

The present invention was developed in view of such a technical problem and aims to realize high down-shift responsiveness of a sub-transmission mechanism and prevent the occurrence of an engine runup and a shift shock in a CVT with the sub-transmission mechanism including a manual mode.

According to an aspect of the present invention, a continuously variable transmission mounted in a vehicle to shift and transmit output rotation of a driving source, includes a variator which changes a speed ratio continuously; a stepped sub-transmission mechanism provided in series with the variator; and a transmission control unit which selects either one of an auto mode in which a final through speed ratio as a target value of an overall speed ratio of the variator and the sub-transmission mechanism is set based on a driving condition of the vehicle and the variator and the sub-transmission mechanism are controlled to realize the final through speed ratio or a manual mode in which a gear position of the continuously variable transmission is selected based on an input operation from a driver, the final through speed ratio is set based on the selected gear position and the variator and the sub-transmission mechanism are controlled to realize the final through speed ratio. The transmission control unit reduces a hydraulic pressure of a release-side frictional engagement element which is to be released of the sub-transmission mechanism and reduces this reduction amount as an input torque to the sub-transmission mechanism increases at the time of starting a shift when the manual mode is selected, the input torque is positive and the sub-transmission mechanism is to be shifted down.

According to another aspect of the present invention, a control method for a continuously variable transmission including a variator which changes a speed ratio continuously and a stepped sub-transmission mechanism provided in series with the variator and mounted in a vehicle to shift and transmit output rotation of a driving source. The method includes selecting either one of an auto mode in which a final through speed ratio as a target value of an overall speed ratio of the variator and the sub-transmission mechanism is set based on a driving condition of the vehicle and the variator and the sub-transmission mechanism are controlled to realize the final through speed ratio or a manual mode in which a gear position of the continuously variable transmission is selected based on an input operation from a driver, the final through speed ratio is set based on the selected gear position and the variator and the sub-transmission mechanism are controlled to realize the final through speed ratio; and reducing a hydraulic pressure of a release-side frictional engagement element which is to be released of the sub-transmission mechanism and reducing this reduction amount as an input torque to the sub-transmission mechanism increases at the time of starting a shift when the manual mode is selected, the input torque is positive and the sub-transmission mechanism is to be shifted down.

Embodiments and advantages of this invention will be described in detail below with reference to the attached figures.

DESCRIPTION OF THE PREFERRED EMBODIMENTS

Hereinafter, an embodiment of the present invention is described with reference to the accompanying drawings. In the following description, a "speed ratio" of a certain transmission is a value obtained by dividing an input rotation speed of this transmission by an output rotation speed thereof. A "lowest speed ratio" means a maximum speed ratio of this transmission and a "highest speed ratio" means a minimum speed ratio thereof.

Figure 1:
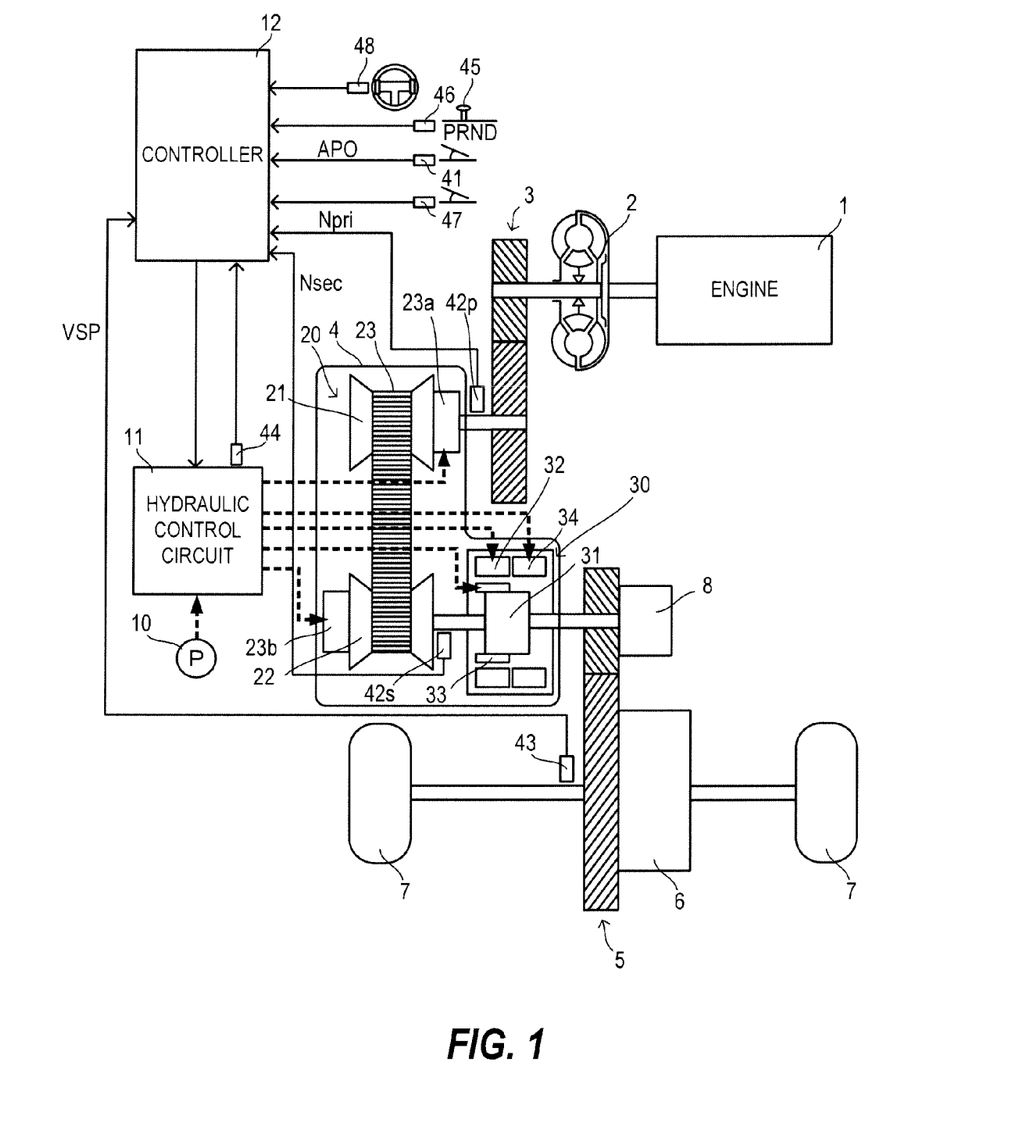
FIG. 1 is a schematic construction diagram of a vehicle including a continuously variable transmission according to an embodiment of the present invention.

FIG. 1 is a schematic construction diagram of a vehicle including a continuously variable transmission according to this embodiment. This vehicle includes an engine 1 as a driving source. Output rotation of the engine 1 is transmitted to drive wheels 7 via a torque converter 2 with a lock-up clutch, a first gear train 3, a continuously variable transmission (hereinafter, merely referred to as a "transmission 4"), a second gear train 5 and a final speed reducer 6. The second gear train 5 includes a parking mechanism 8 for mechanically locking an output shaft of the transmission 4 in a parked state so as not to be able to rotate.

The vehicle is provided with an oil pump 10 which is driven using a part of power of the engine 1, a hydraulic control circuit 11 for adjusting a hydraulic pressure from the oil pump 10 and supplying the adjusted hydraulic pressure to respective components of the transmission 4 and a transmission controller 12 for controlling the hydraulic control circuit 11.

The respective constructions are described. The transmission 4 includes a continuously variable transmission mechanism (hereinafter, referred to as a "variator 20") and a sub-transmission mechanism 30 provided in series with the variator 20. "To be provided in series" means that the variator 20 and the sub-transmission mechanism 30 are provided in series in this power transmission path. The sub-transmission mechanism 30 may be directly connected to an output shaft of the variator 20 as in this example or may be connected via another transmission or power transmission mechanism (e.g. gear train).

The variator 20 is a V-belt continuously variable transmission mechanism including a primary pulley 21, a secondary pulley 22 and a V-belt 23 mounted between the pulleys 21 and 22. Each of the pulleys 21, 22 includes a fixed conical plate, a movable conical plate arranged with a sheave surface faced toward the fixed conical plate and forming a V-groove between the fixed conical plate and the movable conical plate, and a hydraulic cylinder 23a, 23b provided on the back surface of the movable conical plate for displacing the movable conical plate in an axial direction. When hydraulic pressures supplied to the hydraulic cylinders 23a, 23b are adjusted, the width of the V-groove changes to change contact radii of the V-belt 23 and the respective pulleys 21, 22, whereby a speed ratio vRatio of the variator 20 continuously changes.

The sub-transmission mechanism 30 is a transmission mechanism with two forward speeds and one reverse speed. The sub-transmission mechanism 30 includes a Ravigneaux-type planetary gear mechanism 31 in which carriers of two planetary gears are coupled, and a plurality of frictional engagement elements (low brake 32, high clutch 33, reverse brake 34) which are connected to a plurality of rotation elements constituting the Ravigneaux-type planetary gear mechanism 31 to change coupled states of these rotation elements. If the supply of hydraulic pressures to the respective frictional engagement elements 32 to 34 are adjusted to change engaged and released states of the respective frictional engagement elements 32 to 34, a gear position of the sub-transmission mechanism 30 is changed. For example, the sub-transmission mechanism 30 is set to a first gear position if the low brake 32 is engaged and the high clutch 33 and the reverse brake 34 are released. The transmission mechanism 30 is set to a second gear position with a speed ratio smaller than in the first gear position if the high clutch 33 is engaged and the low brake 32 and the reverse brake 34 are released. The sub-transmission mechanism 30 is set to a reverse gear position if the reverse brake 34 is engaged and the low brake 32 and the high brake 33 are released. In the following description, a case where the sub-transmission mechanism 30 is in the first gear position is expressed by that "the transmission 4 is in a low-speed mode" and a case where the sub-transmission mechanism is in the second gear position is expressed by that "the transmission 4 is in a high-speed mode".

Figure 2:
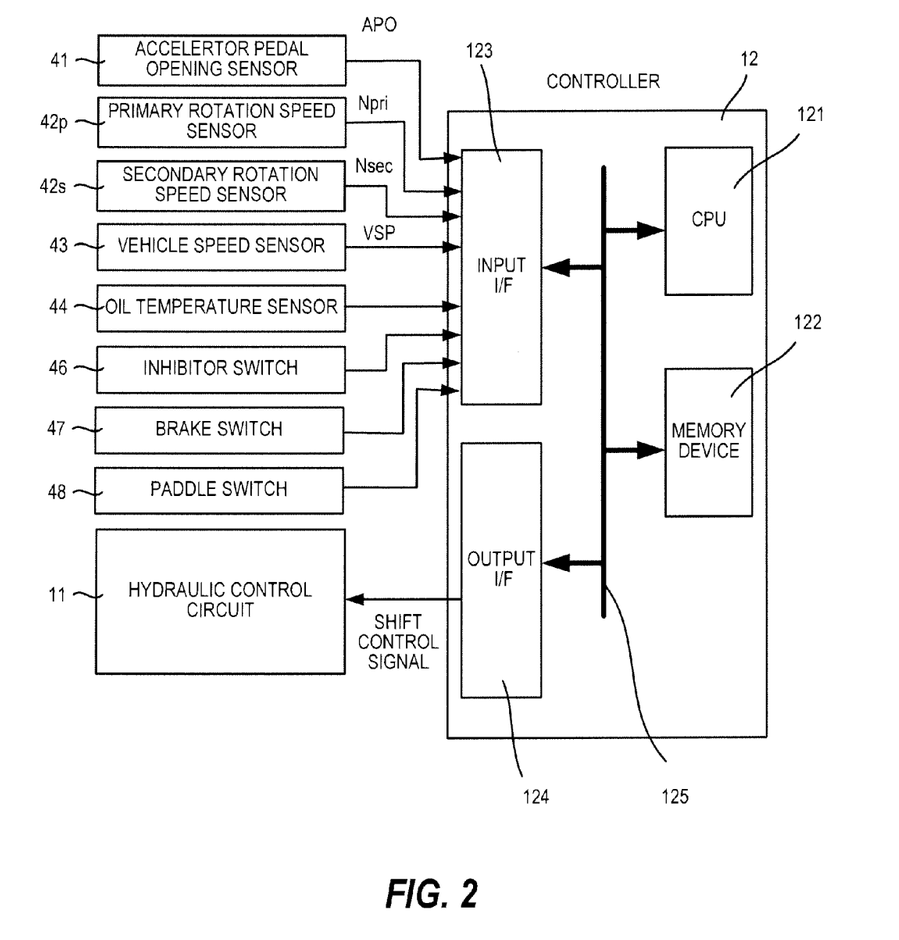
FIG. 2 is a diagram showing the internal construction of a transmission controller.

The transmission controller 12 includes a CPU 121, a memory device 122 composed of a RAM/ROM, an input interface 123, an output interface 124 and a bus 125 which connects these components to each other as shown in FIG. 2.

To the input interface 123 are input an output signal of an accelerator pedal opening sensor 41 for detecting the opening of an accelerator pedal (hereinafter, referred to as an "accelerator pedal opening APO"), an output signal of a primary rotation speed sensor $42p$ for detecting an input rotation speed of the transmission 4 (=rotation speed of the primary pulley 21, hereinafter, referred to as a "primary rotation speed Npri"), an output signal of a secondary rotation speed sensor $42s$ for detecting an output rotation speed of the transmission 4 (=rotation speed of the secondary pulley 22, hereinafter, referred to as a "secondary rotation speed Nsec"), an output signal of a vehicle speed sensor 43 for detecting a driving speed of the vehicle (hereinafter, referred to as a "vehicle speed VSP"), an output signal of an oil temperature sensor 44 for detecting the oil temperature of the transmission 4, an output signal of an inhibitor switch 46 for detecting the position of a selector 45, an output signal of a brake switch 47 for detecting depression of a brake pedal, an output signal of a paddle switch 48 for selecting a gear position in a manual mode to be described later, and like output signals.

A transmission control program of the transmission 4 and shift maps (FIGS. 3, 4) used in this transmission control program are stored in the memory device 122. The CPU 121 reads the transmission control program stored in the memory device 122 and implements it, performs various computations on various signals input via the input interface 123 to generate a shift control signal, and outputs the generated shift control signal to the hydraulic control circuit 11 via the output interface 124. Various values used in the computations by the CPU 121 and computation results are appropriately stored in the memory device 122.

The hydraulic control circuit 11 includes a plurality of flow passages and a plurality of hydraulic control valves. In accordance with the shift control signal from the transmission controller 12, the hydraulic control circuit 11 controls the plurality of hydraulic control valves to switch supply paths of the hydraulic pressure, prepares a necessary hydraulic pressure from a hydraulic pressure produced in the oil pump 10, and supplies this hydraulic pressure to the respective components of the transmission 4. In this way, the speed ratio vRatio of the variator 20 and the gear position of the sub-transmission mechanism 30 are changed to shift the transmission 4.

An accumulator for preventing a shock caused by sudden engagement of the frictional engagement elements is provided before the low brake 32.

Figure 3:
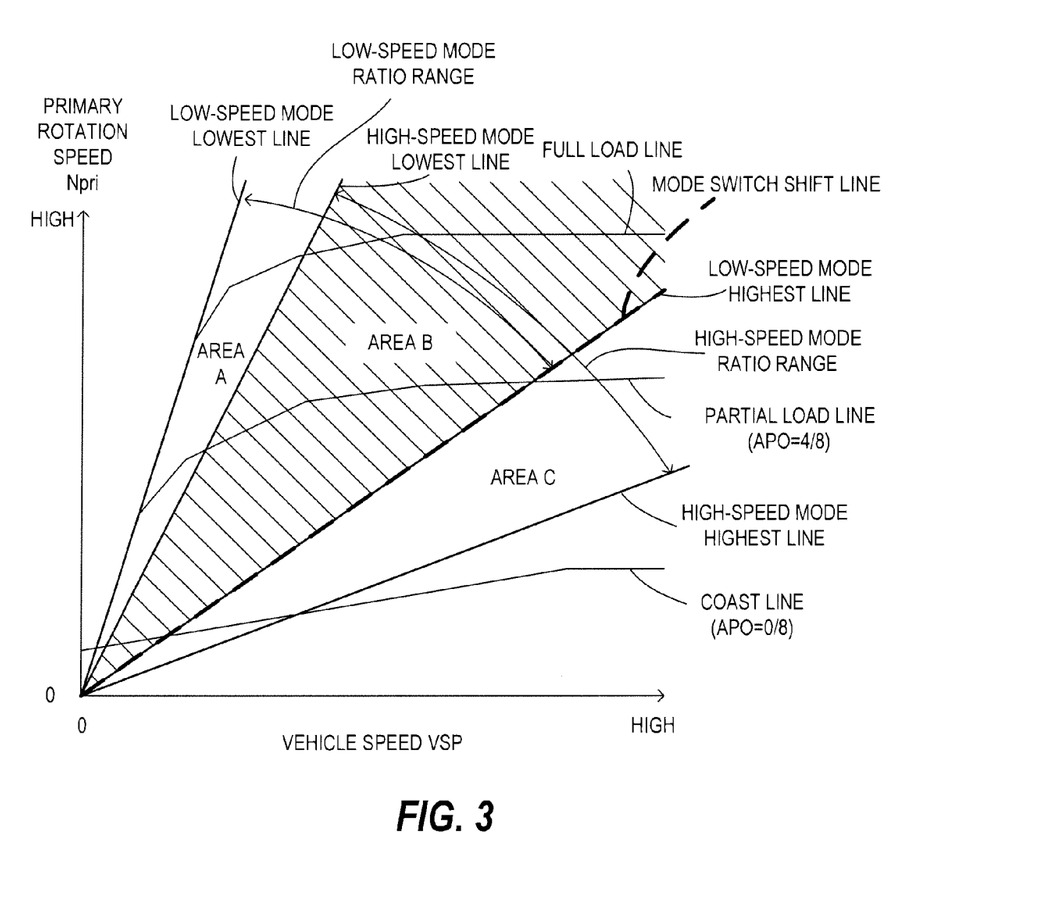
FIG. 3 is a graph showing an example of a shift map used in an auto mode.

FIG. 3 shows an example of the shift map stored in the memory device 122 of the transmission controller 12. This shift map is a map used in a mode in which the selector 45 is in a D position and the shift of the transmission 4, i.e. shifts of the variator 20 and the sub-transmission mechanism 30 are automatically made based on the accelerator pedal opening APO and the vehicle speed VSP (hereinafter, referred to as an "auto mode").

On this shift map, an operating point of the transmission 4 is determined by the vehicle speed VSP and the primary rotation speed Npri. The inclination of a line connecting the operating point of the transmission 4 and a zero point at the lower left corner of the shift map indicates the speed ratio of the transmission 4 (overall speed ratio obtained by multiplying the speed ratio vRatio of the variator 20 by a speed ratio subRatio of the sub-transmission mechanism 30, hereinafter, referred to as a "through speed ratio Ratio"). In this shift map, a shift line is set for each accelerator pedal opening APO similar to a shift map of a conventional V-belt continuously variable transmission, and the transmission 4 is shifted in accordance with the shift line selected based on the accelerator position APO. For simplicity, only a full load line (shift line when the accelerator pedal opening APO=8/8), a partial load line (shift line when the accelerator pedal opening APO=4/8) and a coast line (shift line when the accelerator pedal opening APO=0/8) are shown in FIG. 3.

When being in the low-speed mode, the transmission 4 can be shifted between a low-speed mode lowest line obtained by maximizing the speed ratio vRatio of the variator 20 and a low-speed mode highest line obtained by minimizing the speed ratio vRatio of the variator 20. At this time, the operating point of the transmission 4 moves in areas A and B. On the other hand, when being in the high-speed mode, the transmission 4 can be shifted between a high-speed mode lowest line obtained by maximizing the speed ratio vRatio of the variator 20 and a high-speed mode highest line obtained by minimizing the speed ratio vRatio of the variator 20. At this time, the operating point of the transmission 4 moves in areas B and C.

The speed ratio of each gear position of the sub-transmission mechanism 30 is so set that the speed ratio corresponding to the low-speed mode highest line (low-speed mode highest speed ratio) is smaller than the speed ratio corresponding to the high-speed mode lowest line (high-speed mode lowest speed ratio). By this, a low-speed mode ratio range which is a range of the through speed ratio Ratio of the transmission 4 that can be set in the low-speed mode and a high-speed mode ratio range which is a range of the through speed ratio Ratio of the transmission 4 that can be set in the high-speed mode partly overlap, and the transmission 4 can be selectively set in either one of the low-speed mode or the high-speed mode if the operating point of the transmission 4 is in the area B defined between the high-speed mode lowest line and the low-speed mode highest line.

The transmission controller 12 sets the through speed ratio Ratio corresponding to the vehicle speed VSP and the accelerator pedal opening APO (driving condition of the vehicle) as a final through speed ratio DRatio by referring to this shift map. This final through speed ratio DRatio is a target value which should be finally reached by the through speed ratio Ratio in this driving condition. Then, the transmission controller 12 sets a target through speed ratio tRatio which is a transient target value for causing the through speed ratio Ratio to follow the final through speed ratio DRatio with desired response characteristics, and controls the variator 20 and the sub-transmission mechanism 30 so that the through speed ratio Ratio coincides with the target through speed ratio tRatio.

On this shift map, a mode switch shift line at which the sub-transmission mechanism 30 is shifted is so set as to overlap the low-speed mode highest line. A through speed ratio corresponding to the mode switch shift line (hereinafter, referred to as a "mode switch speed ratio mRatio") is equal to the low-speed mode highest speed ratio.

When the operating point of the transmission 4 crosses the mode switch shift line, i.e. the through speed ratio Ratio of the transmission 4 changes over the mode switch speed ratio mRatio, the transmission controller 12 executes a mode switch shift control. In this mode switch shift control, the transmission controller 12 shifts the sub-transmission mechanism 30 and performs a synchronization shift to change the speed ratio vRatio of the variator 20 in a direction opposite to a changing direction of the speed ratio subRatio of the sub-transmission mechanism 30.

In the synchronization shift, when the through speed ratio Ratio of the transmission 4 changes from a value larger than the mode switch speed ratio mRatio to a value smaller than that, the transmission controller 12 shifts up the gear position of the sub-transmission mechanism 30 from the first gear position to the second gear position (1-2 shift) and increases the speed ratio vRatio of the variator 20. Conversely, when the through speed ratio Ratio of the transmission 4 changes from a value smaller than the mode switch speed ratio mRatio to a value larger than that, the transmission controller 12 shifts down the gear position of the sub-transmission mechanism 30 from the second gear position to the first gear position (2-1 shift) and decreases the speed ratio vRatio of the variator 20.

The synchronization shift is performed at the time of a mode switch shift to suppress a sense of congruity given to a driver as the input rotation changes due to a difference in the through speed ratio Ratio of the transmission 4. The mode switch shift is performed when the speed ratio vRatio of the variator 20 is the highest speed ratio because a torque input to the sub-transmission mechanism 30 is the smallest in this state under a torque input to the variator 20 at that time and a shift shock of the sub-transmission mechanism 30 can be alleviated if the sub-transmission mechanism 30 is shifted in this state.

However, in a construction in which the mode switch shift is merely performed with the mode switch speed ratio mRatio set as a threshold value, the sub-transmission mechanism 30 is frequently shifted when the through speed ratio Ratio changes near the mode switch speed ratio mRatio and there is a possibility of reducing driving performance caused by recurring shift shocks and reducing the durability of the frictional engagement elements (low brake 32, high clutch 33) constituting the sub-transmission mechanism 30.

Accordingly, the transmission controller 12 allows a down shift of the sub-transmission mechanism 30 only in a condition where a large driving force, e.g. a driving force which cannot be attained with the sub-transmission mechanism 30 kept in the second gear position is required such as when the accelerator pedal is largely depressed, thereby lowering a shift frequency of the sub-transmission mechanism 30.

Figure 4:
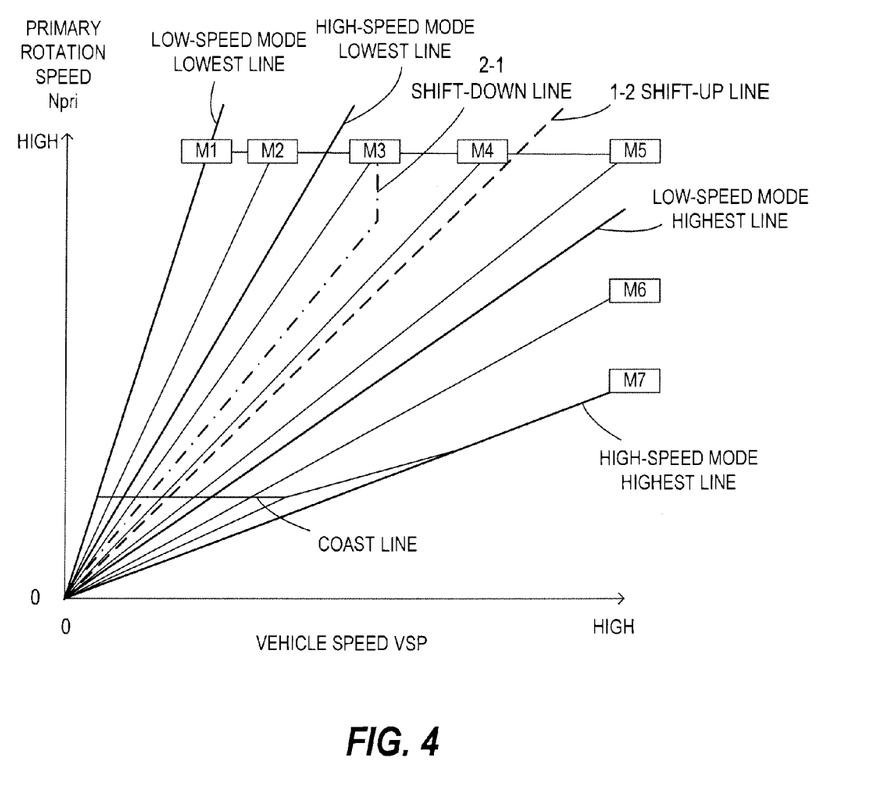
FIG. 4 is a graph showing an example of a shift map used in a manual mode.

On the contrary, in a mode in which the driver can select an arbitrary gear position by a selector operation or paddle operation and the transmission 4 is shifted, i.e. the variator 20 and the sub-transmission mechanism 30 are shifted to realize a speed ratio corresponding to the selected gear position (hereinafter, referred to as a "manual mode"), the shift map shown in FIG. 4 is used. In the following description, the gear positions of the transmission 4 in the manual mode are respectively called M1 gear position to M7 gear position to distinguish the gear positions of the transmission 4 and those of the sub-transmission mechanism 30 in the manual mode.

In this example, it is possible to select one out of the M1 gear position to the M7 gear position. A 1-2 shift-up line and a 2-1 shift-down line of the sub-transmission mechanism 30 are set at positions different from the mode switch shift line in the auto mode. The 1-2 shift-up line is set at a side lower than the low-speed mode highest line and between an M4 gear shift line and an M5 gear shift line, and the 2-1 shift-down line is set at a side higher than the high-speed mode lowest line and between an M3 gear shift line and the M4 gear shift line.

The gear position can be selected by operating the selector 45 (e.g. shifted up when the selector 45 is operated to a + gate and shifted down when it is operated to a − gate) and can also be selected by operating the paddle switch 48 provided on a steering wheel.

In the manual mode, the variator 20 and the sub-transmission mechanism 30 are controlled to realize the selected gear position and, depending on a combination of the present gear position and the selected gear position, the sub-transmission mechanism 30 is shifted. Specifically, the sub-transmission mechanism 30 is shifted in the case of crossing the 1-2 shift-up line or 2-1 shift-down line before and after a shift. Particularly, when the M1 gear position or M2 gear position is set after the shift, the speed ratios corresponding to these gear positions cannot be realized unless the sub-transmission mechanism 30 is in the first gear position. When the M6 gear position or M7 gear position is set after the shift, the speed ratios corresponding to these gear positions cannot be realized unless the sub-transmission mechanism 30 is in the second gear position. Thus, the sub-transmission mechanism 30 is invariably shifted unless the sub-transmission mechanism 30 is in the required gear position.

Even during the shift accompanied by the shift of the sub-transmission mechanism 30 as described above, a shock at the time of the shift can be alleviated if the synchronization shift to shift the variator 20 in a direction opposite to a shifting direction of the sub-transmission mechanism 30 is correctly performed.

However, if the synchronization shift of the variator 20 and the sub-transmission mechanism 30 is performed by shifting down the sub-transmission mechanism 30 when the input torque to the sub-transmission mechanism 30 is large, it is difficult to make a shift while synchronizing the both and there is a possibility of a runup of the engine 1 and a shift shock.

This is firstly because the shift speed of the sub-transmission mechanism 30 is accelerated according to the input torque to the sub-transmission mechanism 30 (reducing speed of the hydraulic pressure of the high clutch 33 is accelerated), whereas the shift speed of the variator 20 becomes slower than that of the sub-transmission mechanism 30 due to an inertia or like influence. Thus, synchronization of the both is lost. Secondly, since the inertia phase of the sub-transmission mechanism 30 accelerates as the input torque to the sub-transmission mechanism 30 increases, the supply of the hydraulic pressure to the low brake 32 is delayed and the low brake 32 is suddenly engaged with delay.

Accordingly, in this embodiment, a control to be described below is executed to suppress the runup of the engine 1 and a shift shock at the time of a shift while realizing a quick down shift when the input torque to the sub-transmission mechanism 30 is positive and the sub-transmission mechanism 30 is to be shifted down (hereinafter, referred to as a "power-on down shift").

Figure 5:
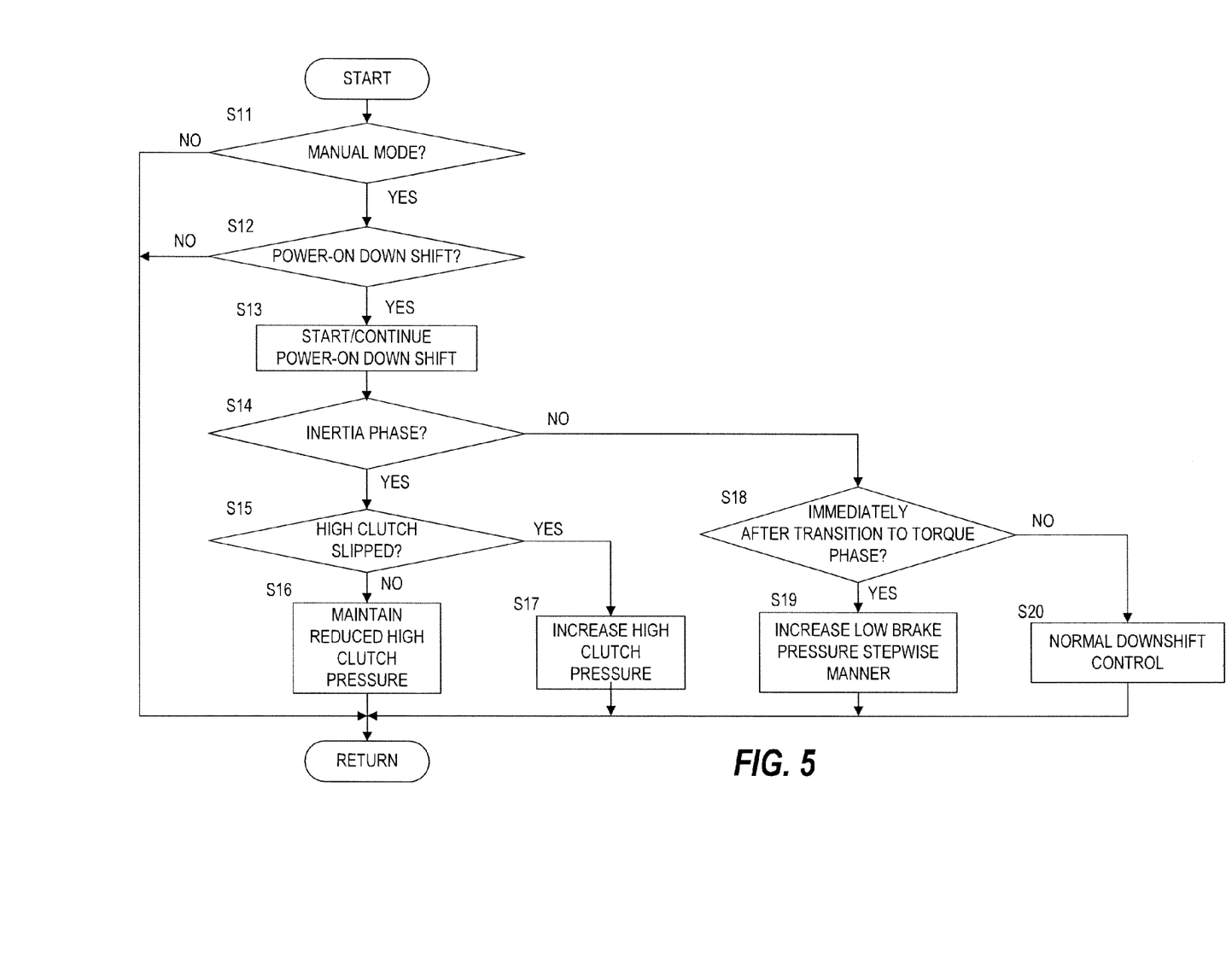
FIG. 5 is a flow chart showing the content of a transmission control at the time of a power-on down shift.

FIG. 5 shows a control content at the time of a power-on down shift out of the transmission control executed by the transmission controller 12. The control content at the time of the power-on down shift is described in detail with reference to FIG. 5. This flow chart is repeatedly performed at every interval of a specified time (e.g. every 10 msec.).

In S11, the transmission controller 12 judges whether or not the transmission 4 is in the manual mode. The transmission controller 12 judges that transmission 4 is in the manual mode, for example, when the selector 45 is in an M position or the paddle switch 48 is operated. The process proceeds to S12 when the transmission 4 is judged to be in the manual mode while ending when the transmission 4 is not judged to be in the manual mode.

In S12, the transmission controller 12 judges whether or not the shift is a power-on down shift. The shift is judged to be the power-on down shift, for example, when the input torque to the sub-transmission mechanism 30 is greater than zero, the present gear position of the sub-transmission mechanism 30 is the second gear position and the 2-1 shift-down line is crossed or an operating point enters the area A of FIG. 3 if the speed ratio is changed to the one corresponding to the selected gear position at the vehicle speed VSP at that time. The process proceeds to S13 when the shift is judged to be the power-on down shift while ending unless otherwise. The input torque to the sub-transmission mechanism 30 is calculated, for example, based on an engine torque, the speed ratio of the variator 20 and an inertial torque accompanying the shift of the sub-transmission mechanism 30 and the like.

In S13, the transmission controller 12 starts the power-on down shift. Specifically, the transmission controller 12 increases the through speed ratio Ratio by reducing the hydraulic pressure of the high clutch 33 according to the input torque to the sub-transmission mechanism 30 (preparatory phase). The larger the input torque, the smaller the reduction amount of the hydraulic pressure of the high clutch 33 at this time. In this way, regardless of the magnitude of the input torque, the through speed ratio Ratio is changed toward the final through speed ratio DRatio in a short time and down-shift responsiveness is improved. If the power-on down shift is already being performed, it is continued and the process proceeds to S14.

In S14, the transmission controller 12 judges whether or not the shift of the sub-transmission mechanism 30 is in an inertia phase. The inertia phase is a period during which the speed ratio of the sub-transmission mechanism 30 actually changes, and the sub-transmission mechanism 30 quickly enters the inertia phase after the preparatory phase. The process proceeds to S15 when the shift of the sub-transmission mechanism 30 is judged to be in the inertia phase while proceeding to S18 unless otherwise.

In S15, the transmission controller 12 judges whether or not the high clutch 33 has slipped. Judgment as to whether or not the high clutch 33 has slipped is made by a comparison of a change rate of an actual inertia advance rate and that of a target inertia advance rate. The actual inertia advance rate is defined as a ratio of an actual secondary rotation speed Nsec to a secondary rotation speed attained after the shift, whereas the target inertia advance rate is defined as a ratio of a target secondary rotation speed at that time to a secondary rotation speed attained after the shift. The target secondary rotation speed is a value determined by a target period (time interval from the start to the end) of the inertia phase.

When the change rate of the actual inertia advance rate is larger than that of the target inertia advance rate, the high clutch 33 is judged to have slipped and the process proceeds to S17. The process proceeds to S16 unless otherwise.

In S16, the transmission controller 12 maintains the hydraulic pressure of the high clutch 33 reduced in S13 and changes the through speed ratio Ratio to the final through speed ratio DRatio.

On the other hand, in S17, the transmission controller 12 increases the hydraulic pressure of the high clutch 33 to a predetermined pressure. The predetermined pressure is a borderline pressure at which the high clutch 33 slips. In this way, the final through speed ratio DRatio is maintained and it is prevented that the high clutch 33 slips too much and the actual inertial advance rate advances much ahead of the target inertia advance rate, i.e. the high clutch 33 slips to cause the runup of the engine 1.

When the speed ratio of the sub-transmission mechanism 30 changes to the speed ratio corresponding to the first gear position and the inertia phase ends, the process proceeds from S14 to S18.

In S18, the transmission controller 12 judges whether or not the present state is a state immediately after transition to a torque phase. The torque phase is a phase in which the frictional engagement element responsible for torque transmission is switched, and whether or not the present state is the state immediate after transition to the torque phase can be judged based on whether or not the shift of the sub-transmission mechanism 30 has been completed. The process proceeds to S19 when the present state is judged to be the state immediately after transition to the torque phase while proceeding to S20 unless otherwise.

In S19, the transmission controller 12 increases the hydraulic pressure of the low brake 32 in a stepwise manner. This is because the accumulator is provided before the low brake 32 and an increase of the hydraulic pressure of the low brake 32 is delayed if the hydraulic pressure of the low brake 32 is gradually increased. By increasing the hydraulic pressure of the low brake 32 in a stepwise manner, it is possible to reduce the influence of the accumulator and increase the hydraulic pressure of the low brake 32 without delay.

In S20, the transmission controller 12 executes a normal down shift control. In other words, the transmission controller 12 gradually reduces the hydraulic pressure of the high clutch 33 and increases the hydraulic pressure of the low brake 32 in a ramp mariner, thereby switching the frictional engagement element responsible for torque transmission from the high clutch 33 to the low brake 32 (torque phase). When the torque comes to be transmitted via the low brake 32, the transmission controller 12 zeroes the hydraulic pressure of the high clutch 33 to completely release the high clutch 33 and increases the hydraulic pressure of the low brake 32 to a value corresponding to the input torque to completely engage the low brake 32 (end phase).

Figure 6:
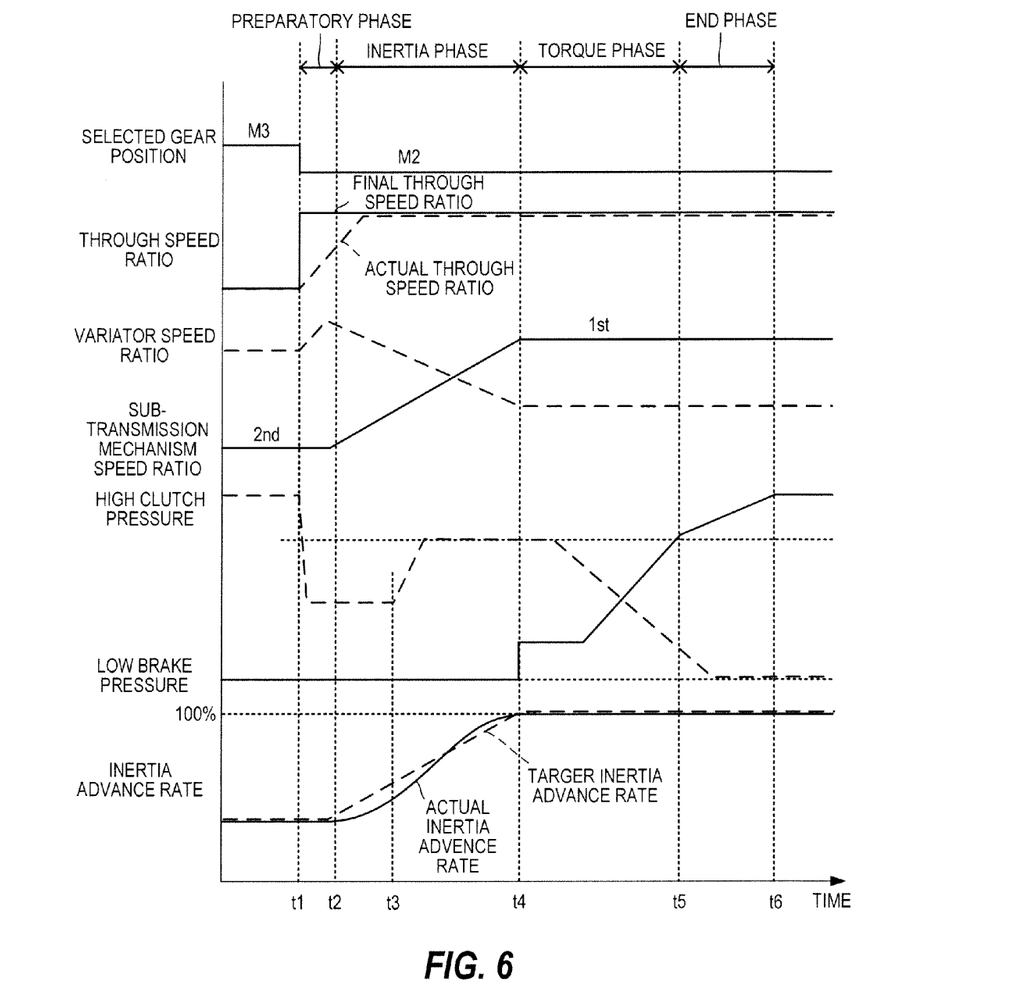
FIG. 6 is a time chart showing a state at the time of the power-on down shift.

FIG. 6 shows a state of the power-on down shift. Functions and effects brought about by executing the above control are described with reference to FIG. 6.

When the selector 45 or the paddle switch 48 is operated and the selected gear position is changed from the M3 gear position to the M2 gear position at time t1, the hydraulic pressure of the high clutch 33 is reduced according to the input torque to the sub-transmission mechanism 30 and the through speed ratio Ratio is increased toward the final through speed ratio DRatio (time t1 to t2). The through speed ratio Ratio is quickly changed after the operation of the selector 45 or the paddle switch 48, thereby realizing high down-shift responsiveness. Since the larger the input torque, the smaller the reduced amount of the hydraulic pressure of the high clutch 33, the runup of the engine 1 caused by an excessive reduction of the hydraulic pressure of the high clutch 33 and conversely a sense of stagnation caused by a slow change of the through speed ratio Ratio due to an insufficient reduction can be prevented.

When the change rate of the actual inertia advance rate exceeds that of the target inertia advance rate at time t3, it is judged that the high clutch 33 has started to slip and, in response to this, the hydraulic pressure of the high clutch 33 is increased to the borderline pressure at which the high clutch 33 slips and the through speed ratio Ratio is maintained at the final through speed ratio DRatio. This prevents the high clutch 33 from slipping too much to cause the runup of the engine 1.

When transition is made to the torque phase at time t4, the hydraulic pressure of the low brake 32 is increased in a stepwise manner at that timing. This can quicken the rise of the hydraulic pressure of the low brake 32 in the torque phase and prevent the runup of the engine 1 and a shift shock caused by a delay in the engagement of the low brake 32.

At time t5 to t6, the end phase is performed and the power-on down shift is ended.

As described above, according to the transmission control at the time of the power-on down shift according to this embodiment, it is possible to realize high down-shift responsiveness while suppressing the runup of the engine 1 and a shift shock.

The embodiment of the present invention has been described above. The above embodiment is merely an illustration of one application example of the present invention and not of the nature to limit the technical scope of the present invention to the specific construction of the above embodiment.

For example, the runup of the engine 1 and the shift shock can be actively suppressed according to the above power-on down shift control. Thus, the target period of the inertia phase can be made shorter than in the auto mode, whereby even higher down-shift responsiveness can be realized.

Although the V-belt continuously variable transmission mechanism is provided as the variator 20 in the above embodiment, the variator 20 may be a continuously variable transmission mechanism in which a chain belt is mounted between the pulleys 21 and 22 instead of the V-belt 23.

Although the engine 1 is provided as the driving source, the driving source may be a combination of the engine 1 and a motor or may be a single motor.

This application claims priority based on Japanese Patent Application No. 2010-200827, filed with the Japan Patent Office on Sep. 8, 2010, the entire content of which is incorporated into this specification by reference.

What is claimed is:

1. A continuously variable transmission mounted in a vehicle to shift and transmit output rotation of a driving source, comprising:
    a variator which changes a speed ratio continuously;
    a stepped sub-transmission mechanism provided in series with the variator; and
    a transmission control unit configured to select either one of:
        an auto mode in which a final through speed ratio as a target value of an overall speed ratio of the variator and the sub-transmission mechanism is set based on a driving condition of the vehicle and in which the variator and the sub-transmission mechanism are controlled to realize the final through speed ratio, or a manual mode in which a gear position of the continuously variable transmission is selected based on an input operation from a driver, the final through speed ratio is set based on the selected gear position, and the variator and the sub-transmission mechanism are controlled to realize the final through speed ratio, wherein the transmission control unit is configured to:
reduce a hydraulic pressure of a release-side frictional engagement element of the sub-transmission mechanism, which release-side frictional engagement element is to be released, and
reduce a reduction amount of the hydraulic pressure of the release-side engagement element as an input torque to the sub-transmission mechanism increases at a time of starting a shift when the manual mode is selected, the input torque is positive, and the sub-transmission mechanism is to be shifted down.

2. The continuously variable transmission according to claim 1, wherein the transmission control unit is configured to increase the hydraulic pressure of the release-side frictional engagement element when the release-side frictional engagement element slips due to the reduction of the hydraulic pressure of the release-side frictional engagement element during an inertia phase of the sub-transmission mechanism.

3. The continuously variable transmission according to claim 1, wherein the transmission control unit is configured to increase the hydraulic pressure of an engage-side frictional engagement element of the sub-transmission mechanism, which engage-side frictional engagement element is to be engaged, in a stepwise manner when an inertia phase of the sub-transmission mechanism ends and a torque phase starts.

4. The continuously variable transmission according to claim 1, wherein the transmission control unit is configured to set a target period of an inertia phase in the manual mode to be shorter than in the auto mode.

5. A control method for a continuously variable transmission including a variator which changes a speed ratio continuously and a stepped sub-transmission mechanism provided in series with the variator and mounted so as to shift and transmit output rotation of a driving source in a vehicle having a transmission controller, the control method comprising:
selecting, by the transmission controller, either one of:
an auto mode in which a final through speed ratio as a target value of an overall speed ratio of the variator and the sub-transmission mechanism is set based on a driving condition of the vehicle and in which the variator and the sub-transmission mechanism are controlled to realize the final through speed ratio, or
a manual mode in which a gear position of the continuously variable transmission is selected based on an input operation from a driver, the final through speed ratio is set based on the selected gear position, and the variator and the sub-transmission mechanism are controlled to realize the final through speed ratio;
reducing, by the transmission controller, a hydraulic pressure of a release-side frictional engagement element of the sub-transmission mechanism, which release-side frictional engagement element is to be released, and
reducing, by the transmission controller, a reduction amount of the hydraulic pressure of the release-side engagement element as an input torque to the sub-transmission mechanism increases at a time of starting a shift when the manual mode is selected, the input torque is positive, and the sub-transmission mechanism is to be shifted down.

6. The control method according to claim 5, wherein the hydraulic pressure of the release-side frictional engagement element is increased by the transmission controller when the release-side frictional engagement element slips due to the reduction of the hydraulic pressure of the release-side frictional engagement element during an inertia phase of the sub-transmission mechanism.

7. The control method according to claim 5, wherein the hydraulic pressure of an engage-side frictional engagement element of the sub-transmission mechanism, which engage-side frictional engagement element is to be engaged, is increased by the transmission controller in a stepwise manner when an inertia phase of the sub-transmission mechanism ends and a torque phase starts.

8. The control method according claim 5, wherein a target period of an inertia phase in the manual mode is set by the transmission controller to be shorter than in the auto mode.

9. A continuously variable transmission mounted in a vehicle to shift and transmit output rotation of a driving source, comprising:
a variator which changes a speed ratio continuously;
a stepped sub-transmission mechanism provided in series with the variator;
means for selecting either one of:
an auto mode in which a final through speed ratio as a target value of an overall speed ratio of the variator and the sub-transmission mechanism is set based on a driving condition of the vehicle and in which the variator and the sub-transmission mechanism are controlled to realize the final through speed ratio, or
a manual mode in which a gear position of the continuously variable transmission is selected based on an input operation from a driver, the final through speed ratio is set based on the selected gear position, and the variator and the sub-transmission mechanism are controlled to realize the final through speed ratio;
means for reducing a hydraulic pressure of a release-side frictional engagement element of the sub-transmission mechanism, which release-side frictional engagement element is to be released, and
means for reducing a reduction amount of the hydraulic pressure of the release-side engagement element as an input torque to the sub-transmission mechanism increases at a time of starting a shift when the manual mode is selected, the input torque is positive, and the sub-transmission mechanism is to be shifted down.

10. The continuously variable transmission according to claim 9, further comprising means for increasing the hydraulic pressure of the release-side frictional engagement element when the release-side frictional engagement element slips due to the reduction of the hydraulic pressure of the release-side frictional engagement element during an inertia phase of the sub-transmission mechanism.

11. The continuously variable transmission according to claim 9, further comprising means for increasing the hydraulic pressure of an engage-side frictional engagement element of the sub-transmission mechanism, which engage-side frictional engagement element is to be engaged, in a stepwise manner when an inertia phase of the sub-transmission mechanism ends and a torque phase starts.

12. The continuously variable transmission according to claim 9, further comprising means for setting a target period of an inertia phase in the manual mode to be shorter than in the auto mode.

* * * * *